United States Patent [19]

Marks

[11] Patent Number: 4,596,451
[45] Date of Patent: Jun. 24, 1986

[54] CRYSTAL PRE-POLARIZER FOR 3D PROJECTION SYSTEM

[76] Inventor: Alvin M. Marks, c/o Ardi, 359 R Main St., Athol, Mass. 01331

[21] Appl. No.: 507,051

[22] Filed: Jun. 23, 1983

[51] Int. Cl.⁴ .............................................. G03B 21/18
[52] U.S. Cl. ...................................... 352/60; 352/198
[58] Field of Search .................... 352/57, 65, 198, 60; 350/394, 400, 401

[56] References Cited

U.S. PATENT DOCUMENTS

| | | | |
|---|---|---|---|
| 1,503,766 | 8/1924 | Pictet et al. | 352/57 |
| 2,821,114 | 1/1958 | Wiemer et al. | 350/394 |
| 3,263,070 | 7/1966 | Hine | 352/198 |
| 3,302,517 | 2/1967 | Henkel | 352/198 |
| 3,308,715 | 3/1967 | Ashcraft | 352/198 |
| 4,372,656 | 2/1983 | Marks et al. | 352/198 |

FOREIGN PATENT DOCUMENTS 471747 9/1937 United Kingdom ................ 350/401

Primary Examiner—Monroe H. Hayes

[57] ABSTRACT

In a 3D motion picture projection system using polarized light, a light source and a reflector for imaging a convergent beam of light onto a film gate, a film with right and left stereo images at the gate, and means for projecting, polarizing and overlapping said stereo images onto a metallized screen; the improvement comprising an optical device for pre-polarizing the convergent light beam, a double refracting crystal located to transmit the convergent light beam, whereby two adjacent orthogonally polarized images, respectively vertical and horizontal, are placed onto the said right and left stereo images at the film gate with substantially no light loss; and polarized viewers having orthogonally polarized filters with their polarizing axes respectively vertical and horizontal, worn by the observer to separate the 3D images, whereby the light efficiency of the system is doubled.

5 Claims, 7 Drawing Figures

CRYSTAL PRE-POLARIZER FOR 3D PROJECTION SYSTEM

TECHNICAL FIELD

The present invention relates to three-dimensional motion pictures and, in particular, to a polarizing device for 3D motion picture projection.

CROSS-REFERENCE TO RELATED APPLICATIONS

The present invention is an improvement on the device described in an earlier parent application, U.S. patent application Ser. No. 264,055, filed on May 15, 1981, now U.S. Pat. No. 4,372,656 issued Feb. 8, 1983 (for Boosterlite TM I); earlier applications Ser. No. 427,576 filed on Sept. 29, 1982 (for Polarator II TM B) now abandoned; Ser. No. 427,577 filed Sept. 29, 1982 (for Boosterlite II TM A) now abandoned, Ser. No. 463,538 filed Feb. 3, 1983 (for a light funnel) now abandoned said patents and applications being invented by Alvin M. Marks and Mortimer Marks. The invention disclosed herein was solely invented by Alvin M. Marks, and is known as Boosterlite II TM B.

BACKGROUND ART

Stereoscopic motion pictures have been displayed by simultaneously projecting right and left stereo images upon a screen in overlapped relationship while transmitting the light of each image through mutually extinguishing filters, and viewing the overlapped images on the screen through similar mutually extinguishing filters. These filters may comprise colored filters such as red and green, or polarizing filters disposed with their planes of polarization normal to each other.

Prior art devices have used two projectors and two film strips to overlap the projected stereo images upon the screen, one projector having the film for right eye images and the other for left eye images. In the two projector systems, the images were difficult to synchronize, adjustment of the position of the overlapped images was time consuming, and the image light intensities were frequently out of balance. Such systems also necessitated the additional expenses of twice as much film as standard motion pictures, extra handling in the projection booth, synchronization, etc. As a result of these technical difficulties and extra costs, the two-projector stereoscopic process is seldom now used by the motion picture industry.

It has been proposed to print left and right motion picture stereo pictures on a single film frame and to project them simultaneously using a single projector. The stereo pictures may be printed side by side upon the film or one above the other. Mirrors have been employed to bring the two images into overlapping relationshp upon the screen. Such optical devices, however, have been responsible for substantial light loss resulting in dull, unsatisfactory projection. Moreover, prior art optical devices employed for stereo projection of single strip stereo images are bulky, difficult to adjust, and often require substantial modification for use with the standard motion picture projector.

Most of the above problems of the prior art were solved to a considerable extent by an adapter which is disclosed in U.S. Pat. No. 3,851,955. In accordance with this patent, the adapter comprises a housing which was secured to the projection lens of a standard motion picture projector. The projector was supplied with a motion picture film having a series of abutting stereo image pairs thereon: Light from the stereo pairs was directed through two prisms carried by the housing. The prisms were mounted and were angularly adjustable to enable the stereo pairs to be aligned in overlapping relationship upon a theater screen.

Light polarizing filters were incorporated with each of the prisms with their planes of polarization at 90° with respect to each other. The prisms were disposed within the housing in close proximity to each other and abutting along one margin. To accommodate the prism assembly to various screen throw distances and screen sizes, the conventional projection lens was supplemented or replaced by a zoom lens, whereby focus may be re-established along with precise positioning of the overlapped imaged upon the screen. The film was printed with an opaque band between the stereo pairs of a single frame. When the pairs overlapped the opaque band formed sharp black edges for the image projected on the screen, such as conventional projection produces. The meeting edges of the prisms in front of the projector were also masked by the opaque band.

Although the above system solved a number of the disadvantages of prior art systems, it suffered from a number of inadequacies. For example, it required achromatic prisms to deflect the images. These prisms are expensive. They caused a slight linear and chromatic aberration of the projected image and were bulky and heavy. The primary prism has an angle of about 4.5°. To increase this angle for certain projection distances the system may require the hand insertion of trimmer prisms having an angle of one or two degrees. These trimmer prisms, for reasons of economy, are not achromatic.

The invention disclosed in U.S. patent application Ser. No. 331,779 filed Dec. 17, 1981 addressed these problems. It provided for a conventional projector with optics for 3-D projection with improved economy, simplicity of installation, and a minimum of bulk known as Polarator II TM (A). The same was achieved by shortening the path length of the device by passing the light from the film in the projector through a prism reflector having index of refraction of 1.53 or more and twice deflecting each of the individual images of a 3-D image pair to be focused upon the projection screen in the desired position. In accordance with the preferred embodiment the same was achieved by using a pair of simple non-achromatic prisms with surfaces having reflective coatings. In accordance with this preferred embodiment, one prism of each of the pairs is provided with an angularly adjustment mounting to provide for the alignment function. No trimmer prisms are needed.

In a copending application Ser. No. 06/427,576 filed Sept. 29, 1982 improvement was sought through the elimination of the reflective coatings on the inner and outer prisms in the device, and the substitution therefor of total internal reflection. Total internal reflection is effected by an appropriate angular positioning of the prisms and by the type of glass used. This improvement, known as Polarator II TM (B), results in lower cost of manufacture and increases the light transmission efficiency by about 20%.

In the above-noted parent application a beam splitter device is disclosed which utilizes polarization by reflection and transmission to split a beam of incident light into two beams polarized mutually perpendicular to each other. These polarized beams are directed onto the images of a stereo pair occupying adjacent halves of the film gate area of a motion picture projector. Subsequently, dichroic polarizers were used to increase the percentage of polarization from about 95% after transmission of the light through the polarizing beam splitter to about 99.9% in the beam projected onto the screen. Since the dichroic polarizer transmits the parallel component of polarized light with an efficiency of 70-80% and since the polarizing beam splitter disclosed in the parent application had an efficiency of about 80%, the overall light efficiency of the device was 56-64%. In the prsent invention a crystal beam splitter is employed which has a 95% light transmittance; hence the overall system efficiency is increased to 76%; and when using the light funnel 37 on FIG. 7 herewith fully described in copending application Ser. No. 463,538 is about 100% of that of the conventional projector light output.

SUMMARY OF THE INVENTION

The present invention (Boosterlite II TM B) is an improvement over the device disclosed in the parent application and in copending application Ser. No. 427,577 filed Sept. 29, 1982. This improvement results from further reduction of the number of optical elements in the optical train of the system and, accordingly, an increase in the intensity of output radiation. Such increase is on the order of about twenty three percent more than that of the device disclosed in the parent application. The present device is simpler, more compact and less expensive.

DETAILED DESCRIPTION OF THE INVENTION

Figure 1:
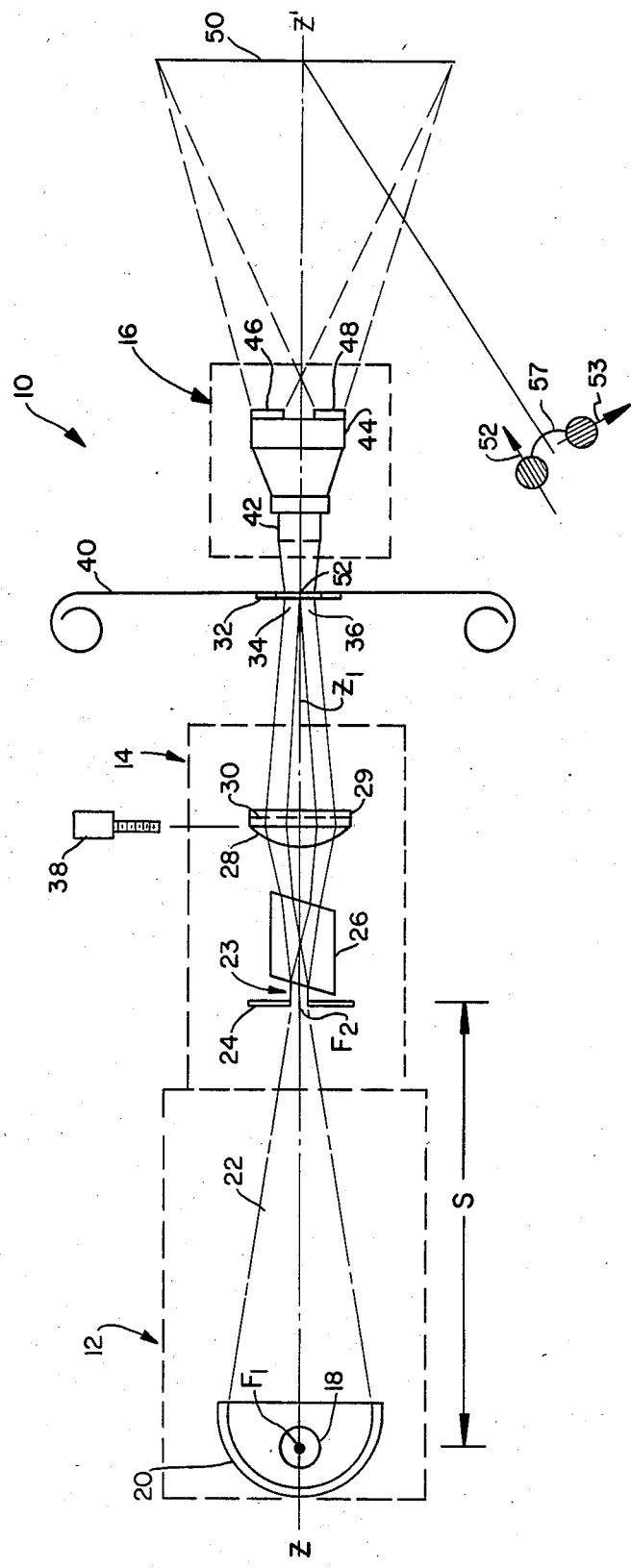
FIG. 1 is a diagrammatic side view of a motion picture projector and viewer system incorporating an optical device constructed according to the invention disclosed in copending application Ser. No. 427,577.

An embodiment of the invention disclosed on the copending application Ser. No. 427,577 is shown in FIG. 1. The projector 10 comprises a lamp housing 12, a beam splitter housing 14, and a projector optics housing 16. The light beam originates at a light source 18, such as a xenon arc lamp, which may have a spot diameter of about 2 mm. The light beam is reflected by elliptical reflector 20, which has foci $F_1$ and $F_2$. The light source 18 is located at focus $F_1$ of elliptical reflector 20. The elliptical reflector 20 focusses the light from light source 18 in a converging beam 22 to the focus $F_2$. The distance between $F_1$ and $F_2$ is s (e.g. s=660 mm). An aperture plate 24 may be located at $F_2$. The circular cross section of the light beam at focus $F_2$ has a Gaussian intensity distribution and may be limited by the aperture plate 24 with little loss of light. After passage through aperture plate 24, the light is transmitted as divergent beam 23, through a doubly refracting crystal 26. The double refraction produces two refracted beams, comprising the ordinary and extraordinary rays, respectively, in the manner well known in the art.

Figure 2:
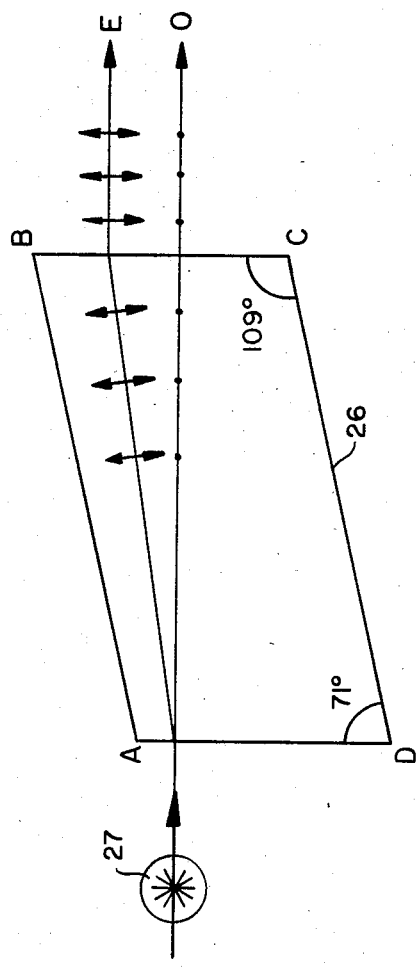
FIG. 2 is a diagrammatic representation of the polarization system of the present invention.

Referring now to FIG. 2, a doubly refracting crystal 26 (such as Calcite, Sodium nitrate, etc.) is shown with an unpolarized light beam 27 incident normally on the face of the crystal. ABCD is a principal section. Inside the crystal the beam is divided into two beams, one of which, O for normal incidence is transmitted through the crystal without deviation, and the other, E, which is refracted upon entering the crystal and is refracted again upon exiting the crystal, emerging parallel to the O beam. The O (ordinary) rays obeys Snell's law of refraction for all angles of incidence of the light beam. The E (extraordinary) ray refracts for normal incidence and does not obey Snell's law, i.e., the ratio of the sine of the angle of incidence to the sine of the angle of refraction varies with the angle of incidence. Since Snell's law physically represents the ratio of the velocity of light in vacuum to that in the medium, it is clear that the velocity of the O ray in the crystal is the same in all directions, whereas the velocity of the E ray in the crystal is different in different directions. A beam of ordinary unpolarized light may be considered as random electric vibrations 27 normal to the incident ray axis which may be resolved into two mutually perpendicular electric vectors E and O with planes transverse to the direction of beam direction. In FIG. 2 the arrows transverse to the light beams denote the electric vector in the plane of incidence (plane of the figure) and the dots denote the electric vector perpendicular to the plane of incidence. Thus it can be seen from FIG. 2 that the O ray is plane polarized with the vibration plane perpendicular to the principal section ABCD and the E ray is plane polarized with its vibration plane in the principal section ABCD. The effect of the crystal then is to break the light up into two linearly polarized component rays whose vibration planes are perpendicular to each other, with no energy loss. It should be noted that the normal incident ray in FIG. 2 is for the purposes of illustration only and oblique incidence also produces double refraction.

Figure 3:
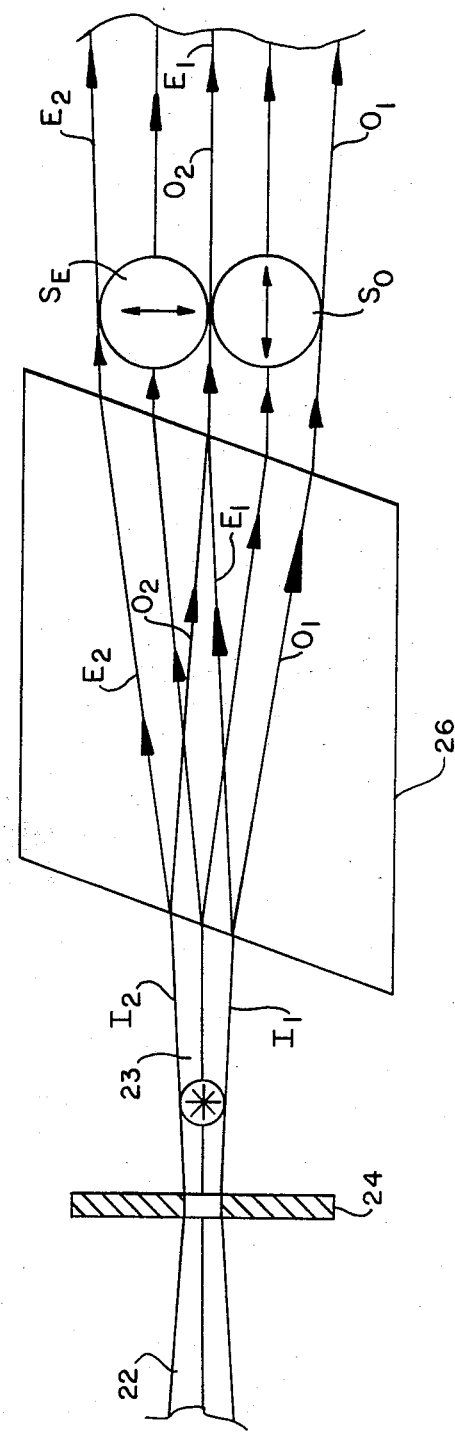
FIG. 3 is a sectional view similar to FIG. 2.

In the sectional view of FIG. 3, the incident conical beam is defined by incident rays $I_1$ and $I_2$. At the entrance surface of the crystal 26 ray $I_1$ is doubly refracted into ordinary ray $O_1$ and extraordinary ray $E_1$. Ray $I_2$ is doubly refracted into ordinary ray $O_2$ and extraordinary ray $E_2$. At the exit surface of crystal 26 the once-refracted rays are refracted a second time. Assuming the entrance and exit surfaces of the crystal are parallel, the laws of geometrical optics require that emerging rays $O_1$ and $E_1$ will be parallel to incident ray $I_1$ and emerging rays $O_2$ and $E_2$ will be parallel to incident ray $I_2$. Rays $O_1$ and $O_2$ define the section of a diverging conical beam comprised of a bundle of ordinary rays. Rays $E_1$ and $E_2$ define the section of a diverging conical beam comprising a bundle of extraordinary rays. The result is that the bundle of incident rays has been separated by double refraction into a bundle of ordinary rays polarized in one direction and a bundle of extraordinary rays polarized at right angles relative to the bundle of ordinary rays (as depicted in FIG. 3). In the embodiment of the earlier invention the bundle of ordinary rays diverges as it passes through crystal 26 and forms spot $S_o$, which is polarized in a particular direction, on exit face of crystal 26. The bundles of extraordinary rays produces a second spot $S_E$ which is polarized at right angles to the polarization of spot $S_o$. Some double refracting crystals which may be used in the device of the present invention are given in the following table:

| Material | Formula | $n_o$ | $n_e$ | $\Delta n$ |
|---|---|---|---|---|
| Calcium carbonate (Calcite) | $CaCO_3$ | 1.6583 | 1.4864 | 0.1719 |
| Sodium nitrate (columnar trigonal or rhombic) | $NaNO_3$ | 1.5874 | 1.3361 | 0.2513 |
| Sodium nitrate (colorless or yellow rhombic prisms, hydroscopic) | $NaNO_2$ | | | 0.4 |
| Mercurous chloride (calomel, light tetragonal) | $Hg_2Cl_2$ (insoluble) | 2.656 | 1.973 | 0.683 |
| Mercuric chloride (colorless rhombic, poisonous, corrosive sublimate) | $HgCl_2$ (soluble) | | 1.859 | 0.6 |
| Potassium nitrate (salt peter, colorless rhombic, trigonal) | $KNO_3$ | 1.5056 1.5065 | 1.3346 | 0.1738 |

Referring back to FIG. 1, the respective bundles of ordinary and extraordinary rays pass through lens 29 after exiting crystal 26. The first surface 28 of lens 29 has a positive spherical curvature, and focusses these separate beams comprised respectively of bundles of ordinary and extraordinary rays polarized mutually at right angles onto the gate 32, as adjacent light areas 34 and 36. The second surface 30 of lens 29 has a negative curvature to spread the rays of each beam to fill the image areas, 34, 36 of film gate aperture 32. The lens 29 may be placed between the crystal and the light source as in FIG. 5 but the diameters and focal lengths of lens 29 must be appropriate to each position or between the crystal and the gate as in FIG. 7.

Figure 4:
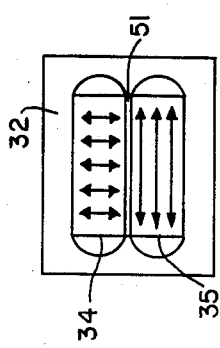
FIG. 4 is a diagram depicting illumination by oppositely polarized light fields incident at the film gate of the projector.

The cross section of each beam is widened so that the respective beams comprising bundles of extraordinary and ordinary rays form fields 34 and 36, respectively, on the film gate aperture 32 as depicted in FIG. 4. Fields 34 and 36 are polarized mutually at right angles.

Figure 5:
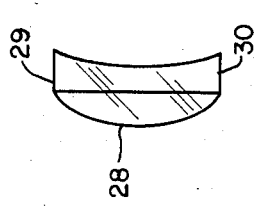
FIG. 5 is a detailed top view of a lens used to focus and direct polarized and separated light beams with respect to the film gate.

A plan view of the lens 29, comprising surfaces 28 and 29 in combination is shown in FIG. 5. An adjusting screw 38 (FIG. 1) is provided to slightly displace the lens at right angles to the optical axis ZZ'. The screw provides a vernier adjustment for the lens combination 28 and 30, to adjust the position of the orthogonally polarized light fields 34 and 36 so that each field of light covers the entire area of its corresponding frame within the film gate aperture 32. Once the separated beams of light are transmitted through the film 40, these beams carry the stereo film images through projector lens 42, optical adaptor 44, and dichroic polarizers 46 and 48 and, onto metallized projection screen 50. The optical adaptor 44 is of the type disclosed in U.S. patent application Ser. No. 427,576 the specification of which is hereby incorporated by reference. The left image of the stereo pair is carried by the bundle of rays polarized in a particular direction; the right image of the stereo pair is carried by the bundle of rays polarized at right angles relative to the bundle of rays carrying the left image. Subsequently, these left-and-right-image-carrying bundles are reflected off of the projection screen 50 and seen by the viewer with mutually orthogonal polarized filters for the left and right eyes. The left eye receives the left-image-carrying carrying bundle of rays and the right eye receives the right-image-carrying bundle; for example, polarized vertically and horizontally as shown by vectors 52 and 53 respectively, to correspond with the polarizing directions of light fields incident on the left and right images on the film 40.

The crystal 26 is rotated as may be required to bring the two fields 34 and 36, formed by the separate beams of mutually polarized light, exactly above and below the dark bar 52 (See FIG. 4) which bisects each film frame and is printed thereon, which is positioned within the gate aperture 32. The lens combination 28 and 30 is vertically adjusted relative to the optical axis, so that double refraction of the incident beam by crystal 26 produces two beams displaced vertically relative to one another, forming tangent elongated spots at the film gate aperture 32. For example, with an incident beam with a 9 mm diameter circular cross section, the adjacent spots must be displaced vertically through a small distance, −4.5 mm and +4.5 mm respectively, at the gate, relative to the optical axis.

The thickness of calcite crystal 26 required to resolve an incident beam of circular cross section of 9 mm diameter into two tangent beams with identical cross section $S_o$ and $S_E$ (9 mm diameter circles) is approximately 81 mm. The dimensions of the crystal required to accommodate the widest beams is about $81 \times 52 \times 42$ mm, allowing a 5 mm margin. The doubly refracted beams exit the crystal as tangent cones of light, apparently issuing from tangent circular spots $S_o$ and $S_E$. The bundles of rays in the respective tangent spots are polarized mutually at right angles.

A sodium nitrate crystal may be used for obtaining the same results as obtained by the calcite crystal. However, because of the greater angle between the ordinary and extraordinary rays, the required crystal thickness is somewhat decreased.

Figure 6:
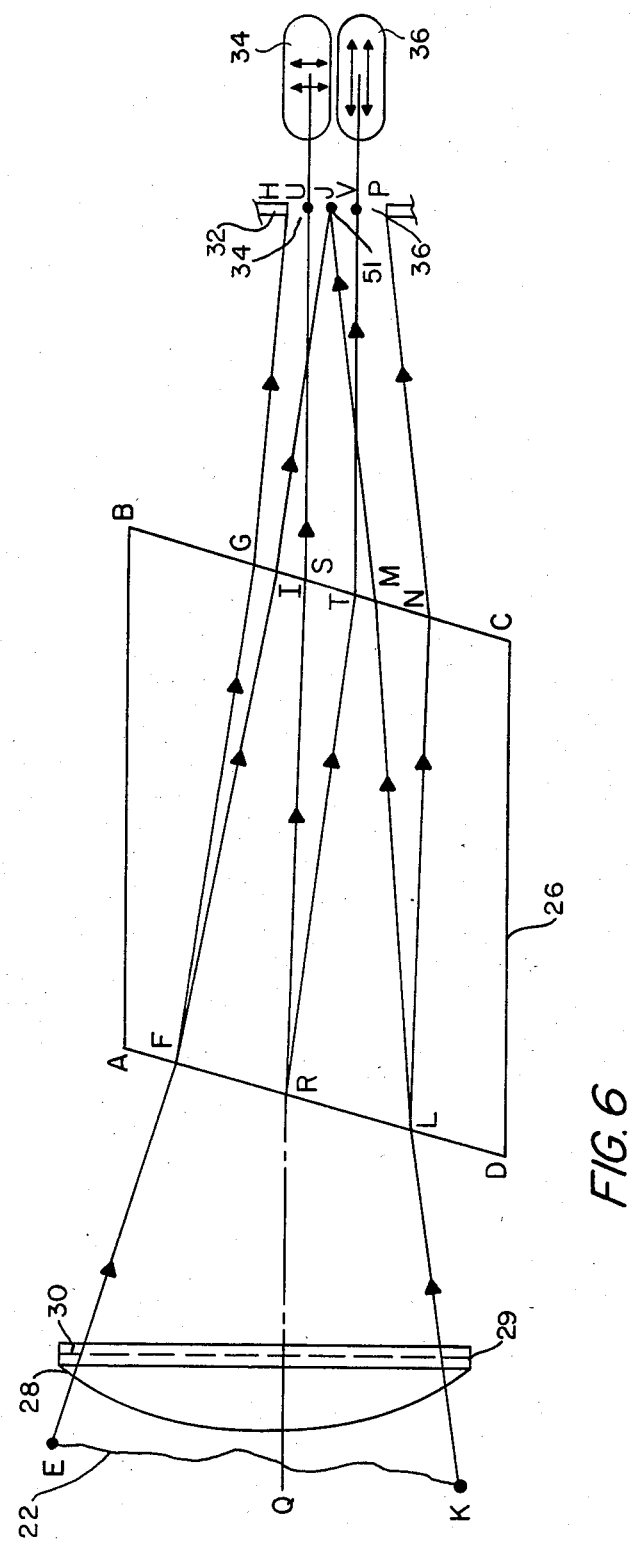
FIG. 6 is a diagram showing an optical system according to the present invention for producing and directing two orthogonally polarized fields of light onto a film gate from a convergent beam of light using a lens and a double refracting crystal.

The above discussion relates to the invention disclosed in copending application Ser. No. 427,577, which is included herein to establish the basic principles of the state of the art prior to the filing of this invention. FIG. 6 shows the newly discovered principle which is the basis for the present invention. In FIG. 6 the converging rays 22 from the reflector 21 are diverged by the cylindric lens surface 30 and would form a single oval field of light at the focus $F_2$. However, the converging light beam is passed directly through the crystal 26 whereupon it is split into two orthogonally polarized oval fields of light 34 and 36 at the film gate 32.

The rays to the upper field 34: EFGH, QRSU, KLMJ are the extraordinary rays polarized vertically; and the rays: EFIJ, QRTV, KLNP are the ordinary rays, polarized horizontally. The polarization of light by the double refracting crystal occurs substantially without loss; because these crystals are colorless (water white), and laminated to protecting cover glasses with anti-reflection coatings thereon.

Figure 7:
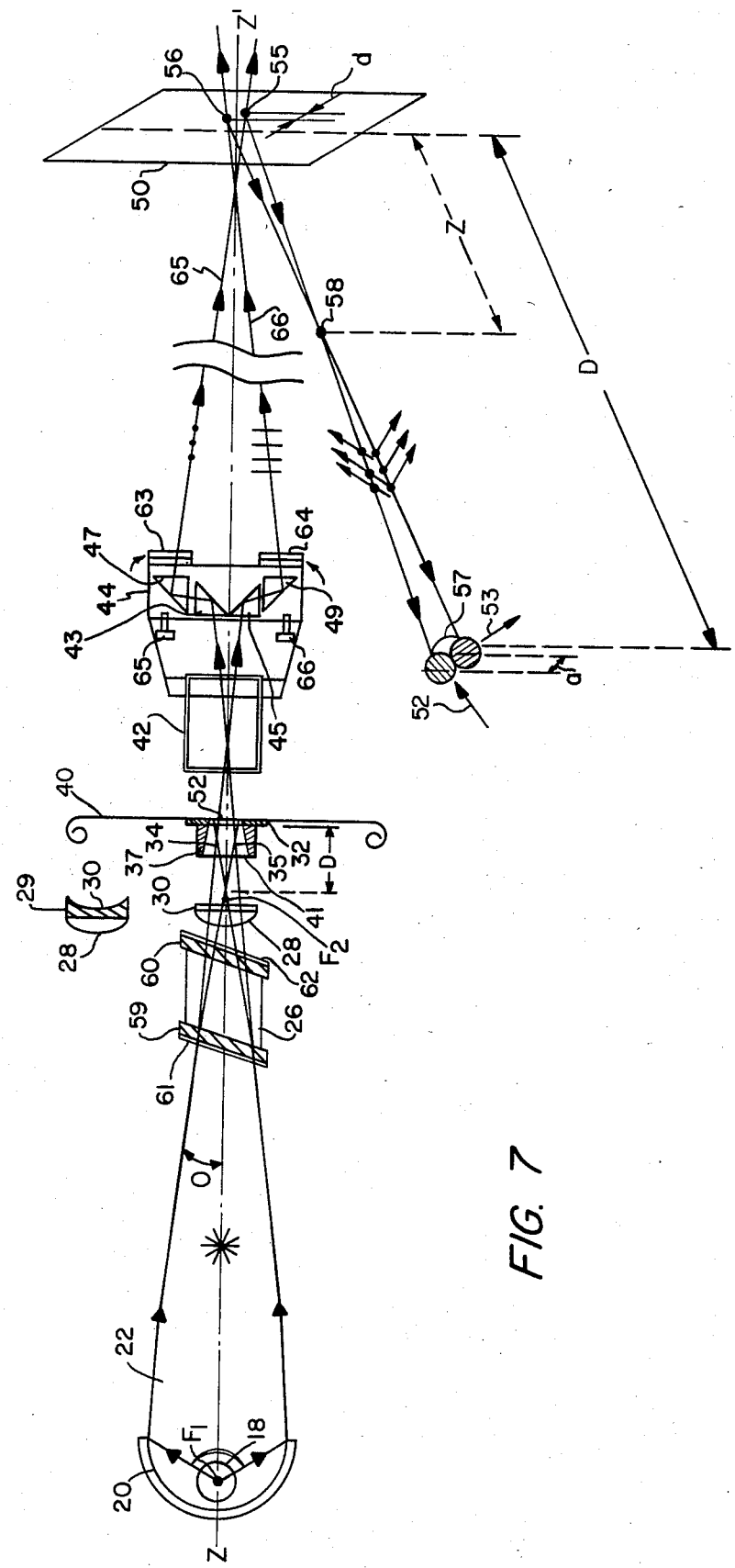
FIG. 7 is a diagrammatic side view of a 3D motion picture projector and viewing system according to this invention, utilizing a double refracting crystal showing a convergent light beam split into two orthogonally polarized light fields at the film gate.

Comparing FIG. 1 and FIG. 7, in the former, the convergent beam first comes to a focus at $F_2$ then passes as a divergent beam through the double refracting crystal 26, thereupon it is focussed by lens 30 onto the film gate 32 as two orthogonally polarized light fields; in the latter the convergent beam is directly passed through the double refracting crystal 26, the orthogonally polarized light fields are directly focussed on the film gate. In the latter, the length of the system is decreased and the aperture plate 24 is eliminated. The new system shown in FIG. 7 is more compact, more efficient and less expensive. The entrance and exit faces of crystal 26 are parallel to each other and nearly perpendicular to the optical axis ZZ'. Glass plates 59 and 60 are laminated to the entrance and exit faces, respectively, of the crystal 26. The glass plates 59 and 60 are for example, about 3 mm thick and provided with non-reflective coatings 61 and 62, respectively. The glass plates protect crystal 26 against weathering due to humidity and pollutants. The non-reflective coatings 61 and 62 minimize the reflection of light at the interfaces of the glass plates and the air.

FIG. 7 shows a preferred embodiment of this invention which employs a minimum of optical elements, thereby simplifying the design, and decreasing the length and increasing the optical transmittance of the system.

A flat sheet of thickness D and index of refraction n will move the focus of a beam forward by a distance $[(n-1)/n]D$. If the average n of a crystal and glass system is 1.5 and its average thickness is 75 mm, then the focus is moved forward by $[(1.5-1)/1.5]75 = 25$ mm, and the lamp housing thus must be moved back by only this small distance to maintain the focus at the gate in the same position; lens 28 can correct this to zero.

In FIG. 7 light from source 18, such as a xenon lamp, is reflected by a reflecting surface 20, which is an ellipsoid of revolution with focii F1 and F2, located respectively at the light source 18 and near the film gate 32. However, the convergent light beam, after passing through the double refracting crystal 26, the lens 30 and the glass sheets 59 and 60 laminated to the crystal, comes to the first and second focal spots comprising light fields 34 and 36 at the film gate; the first spot being focussed on the first stereo image, the second spot being focussed on the second stereo image. The lens 30 may be placed on either side of crystal 26 as illustrated in FIGS. 6 and 7.

FIG. 4 shows stereo images 34 and 36 arranged at the film gate 32 occupying two areas one above the other, with a black bar 52 of about 1 mm as a horizontal separator between them. The convergent light beam 22 is focussed as two polarized spots, which are spread by the cylindric lens surface 30 to just cover the gate aperture 32.

Since the ordinary ray is deviated by the crystal as though it were a sheet of glass with the index $n_o$, and since this focus is now centered on the lower stereo image in the gate, for standard 35 mm film, this corresponds to vertically upward displacing the optical axis of the system vertically upward by ¼ the frame height of 19 mm or about 5 mm. However, there may also be some tilt to the crystal which may result in a further displacement of about 2 mm. Hence, to align the two polarized spots at the gate, the optical axis of the system should be vertically adjustable by about 10 mm.

Since there is some excess light spilling outside the aperture a light pipe 37 with converging internally reflecting surfaces 35 may be employed to confine the incident light so that it entirely passes through the first aperture or gate, and the light passes substantially entirely through the second aperture of the projection lens 42., as fully disclosed in copending application Ser. No. 463,538 filed 2/3/83, which is incorporated by way of reference.

After passing through the film 40 the two orthogonally polarized stereo images are focused by a conventional single lens 42. The two images are overlapped and further polarized by any suitable means as for example, by a device known as Polarator I TM described in U.S. Pat. No. 3,851,955 issued Dec 3, 1974; or as disclosed in an improved device known as Polarator II TM (A) described in copending application Ser. No. 331,799 filed 9/17/81, or by Polarator II TM (B) Ser. No. 427,576 filed 9/29/82. The latter device 44 is shown in FIG. 7 as a component of the system.

The Polarator II TM (B) 44 comprises fixed prisms 43 and 45, mounted with their long surface at about 40° to the projector axis ZZ' to obtain "total internal reflection" by which means all the light is reflected. Prisms 47 and 49 are angularly adjustable individually by turning the screws 65 and 66. All 4 light transmitting surfaces of the prisms and polarizers are anti-reflection coated, thus the light loss through all 6 surfaces of the Polarator II TM B device is only about 6%. If mirrors were used instead of total internal reflection, about 26% of the light would be lost. This does not take into account the light transmission through the polarizers, which is about 40% without the "Boosterlite," and about 80% with the "Boosterlite" of this invention.

It is essential that all optical elements be strain free (no birefringence) to avoid depolarization of the light, which would decrease light transmission efficiency. Polarizers 63 and 64 are high transmission polarizers with about 80% transmission to parallel polarized light, but only 40% to unpolarized light. The crystal 26 and lens 30 prepolarize the light with no loss, except for about 4% reflection loss. Consequently, the system provides about twice the lighting efficiency of any system with conventional polarizers only.

After passing through the Polarator II TM (B) 44, the orthogonally polarized images are polarized at 0° and 90° respectively, and are focussed onto screen 50, where they appear as corresponding polarized image points 55 and 56 separated by a distance d on the screen 50; which are subsequently seen by an observer through polarized viewers 57, the eyes of the observer being separated by an interocular distance a. The right stereo image goes to the right eye, and the left stereo image goes to the left eye, because the polarized filters 52 and 53 mounted on the viewer are orthogonally polarized with their polarizing axes respectively at 90° and 0° to the horizontal. If the observer is at a distance D from the screen, the image points 55 and 56 will appear to originate from the crossover point 58, in space forward from the screen 50 at a distance $Z=Dd/(a+d)$.

There is herein described a system including specially oriented (0° and 90°) polarized viewers which enables the high efficiency projection of 3D motion pictures or video.

It will be understood that the invention hereinabove described also has application in three-dimensional TV systems.

While illustrative embodiments of the invention have been described, it is, of course, understood that various modifications will be obvious to those of ordinary skill in the art. Such modifications are within the spirit and scope of the invention which is limited and defined only by the appended claims.

Having fully described the invention, what I wish to claim is:

1. A 3D motion picture projector system comprising:
   (a) a light source and a film gate,
   (b) a first means for forming a convergent incident beam from the light source, and focussing said beam to a circular spot,
   (c) double refracting crystal means for splitting said incident beam into a first beam and a second beam, said crystal having a critical length and rotational orientation, such that said first beam and said second beam form two adjacent circular spots, the centers of said circular spots being located on a vertical line, the polarization planes of said first beam being in a direction perpendicular to the polarization plane of said second beam,
   (d) a second means for spreading said circular spots horizontally,
   (e) said film gate defining a first image area and a second image area, said first beam and said second beam being positioned, configured and dimensioned by said second means to place the said first beam onto said first image area and to place the said second beam onto said second image area,
   (f) a projection lens having a second aperture,
   (g) a metallized reflecting screen,
   (h) third means for directing said first and second beams coincidently onto said screen, and
   (i) orthogonally polarized viewers to separate and transmit said first and second images.

2. A 3D motion projector system as in claim 1 wherein said first means comprises an elliptical reflector with a first and a second focal point, said light source being located at said first focal point and said film gate being located near said second focal point, and in which the said polarizing planes are vertical and horizontal.

3. A 3D motion picture projector system as in claim 2 in which said second means comprises a negative cylindric lens for shaping said first and second beams to fill said film gate.

4. A 3D motion picture projector system as in claim 2 in which a light funnel having a rectangular cross-section is placed near said film gate, said light funnel having a critical length and angle to redirect peripheral rays with a single reflection through said first aperture of the film gate into the said second aperture of the projection lens, thereby conserving light that would otherwise be lost outside the said apertures.

5. A 3D motion picture projector system as in claim 1 wherein polarizers are placed between said screen and said third means to increase the polarization of said beams.

* * * * *